Sept. 19, 1950　　　　　H. H. ZODTNER　　　　　2,522,554
　　　　　　　　　　　　　FOUNTAIN PEN Filed March 3, 1947　　　　　　　　　　　　3 Sheets-Sheet 1

INVENTOR.
Harlan H. Zodtner
BY Fidler & Crouse
ATTORNEYS

Sept. 19, 1950             H. H. ZODTNER             2,522,554

FOUNTAIN PEN

Filed March 3, 1947                                   3 Sheets-Sheet 2

INVENTOR.
Harlan H. Zodtner
BY Fidler & Crouse

ATTORNEYS

Sept. 19, 1950     H. H. ZODTNER     2,522,554
FOUNTAIN PEN Filed March 3, 1947     3 Sheets-Sheet 3

INVENTOR.
Harlan H. Zodtner
BY Fidler & Crouse
ATTORNEYS

Patented Sept. 19, 1950

2,522,554

UNITED STATES PATENT OFFICE 2,522,554

FOUNTAIN PEN

Harlan H. Zodtner, Janesville, Wis., assignor to The Parker Pen Company, Janesville, Wis., a corporation of Wisconsin Application March 3, 1947, Serial No. 731,951

11 Claims. (Cl. 120—50)

My invention relates generally to fountain pens, and it has to do particularly with fountain pens having an ink reservoir adapted to be filled by capillary action, the ink also being retained in the reservoir by capillary action subject to discharge to a writing surface under the control of capillary feed means.

One of the objects of my invention is to provide an improved fountain pen of the foregoing character.

Another object is to provide an improved capillary reservoir structure for a pen of the foregoing character, and which has large filling and write out capacities.

A further object is to provide an improved capillary filler type fountain pen having a filling capacity at least as great as pens having mechanical filling mechanisms, and which has the ability to fill quickly, retain the ink once the reservoir is filled, while permitting ready feed of substantially all the ink therefrom under the influence of capillary feed mechanism when the nib, or other writing element is engaged with the writing surface.

Still another object is to provide a capillary fountain pen having an improved filler element which is simple and easy to manufacture and assemble in a pen and which will not deteriorate or decrease in efficiency over a long period of use.

Another object is to provide a capillary filler element having a capillary ink space so formed that it is self-venting, whereby a separate air vent is not required, and substantially all of the void space in the filler element may be utilized for ink storage.

Still another object is to provide a capillary fountain pen having an ink storage space which is substantially unobstructed both longitudinally and laterally.

A further object is to provide a capillary filler element providing a capillary ink space of relatively large total cross section and which is at the same time capable of rapid filling.

It is also an object of my invention to provide a capillary fountain pen having an improved feed for feeding ink from the ink reservoir to the pen nib.

A further object is to provide a capillary fountain pen having a capillary ink space of relatively large transverse cross section and a plurality of ink feed channels intersecting and communicating with the ink space across the entire transverse extent thereof to provide for rapid filling and to facilitate withdrawal of ink from the reservoir by the ink feed during writing.

Other objects of the invention are to provide a capillary filler element having a capillary space of convolute cross section extending longitudinally of the filler element; to provide a capillary filler element formed from a sheet of material of spirally wrapped or rolled form, the convolutions of which are spaced to provide a capillary space therebetween; to provide a capillary filler element which may readily be assembled in and removed from a fountain pen; to provide a capillary filler element and feed defining a capillary system having a minimum of corners or sudden changes in cross-sectional area, whereby the possibility of detrimental capillary edge effect is reduced to a minimum and the pen will fill rapidly and completely, and will write out to a very high degree of efficiency; to provide a capillary filler element having readily predetermined capillary characteristics; to provide a capillary filler element having means for positively maintaining the spacing of the elements which define the capillary ink storage space; to provide a capillary filler element formed by a relatively small number of separate members; and to provide a capillary filler element formed of a sheet of material spirally wrapped with a sheet of spacing material having therein interstices of capillary form; and to provide novel means for delivering ink from the spacing material of the capillary filler element to feed means.

Other objects and advantages of the invention will appear from the following description taken in connection with the appended drawings wherein.

The present invention is illustrated in connection with a fountain pen of the desk type but it will be understood that the invention is equally well adapted for incorporation in a fountain pen of the pocket type or a fountain pen of the dual purpose type having a body adapted to receive either a short rear end piece for use as a pocket pen or an elongated tail piece for use as a desk pen.

Figure 1:
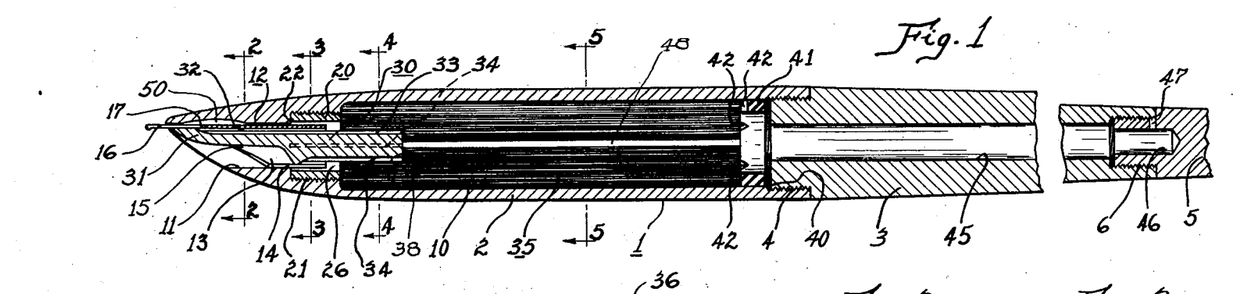
Figure 1 is a fragmentary longitudinal sectional view through a fountain pen embodying my invention.

Referring particularly to Fig. 1 of the drawings, there is shown for the purposes of illustration a fountain pen comprising a body or casing 1 formed of suitable material such as a plastic, and which for convenience in manufacturing and assembling is constituted by a plurality of members or sections. Specifically, the body includes a barrel or forward section 2, a rear section 3 connected thereto as by a threaded joint 4, and a tail piece 5 connected to the rear section 3 as by a threaded joint 6. The forward section 2 is formed with an axially extending bore or chamber defining an ink reservoir chamber 10 and has an axial opening 11 extending from the reservoir chamber 10 through its forward or writing end.

Figure 3:
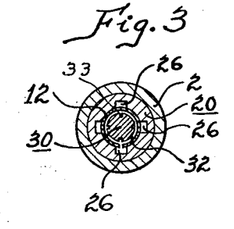
Fig. 3 is a transverse sectional view taken along line 3—3 of Fig. 1.
Figure 5:
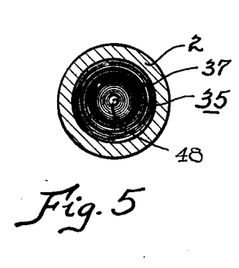
Fig. 5 is a transverse sectional view taken along line 5—5 of Fig. 1.

A writing element is carried at the forward or writing end of the body 1 and is connected by suitable ink feed means to an ink storage reservoir hereinafter described. The writing element takes the form of a nib 12 supported in the opening 11 with its writing end projecting beyond the end of the forward section 2 where it is exposed for writing. The nib 12 may be of any suitable form but preferably is formed with a generally cylindrical body portion 13 having a slot 14 (Figs. 1 and 3) extending along the underside thereof and a tapered arcuate forward portion 15 formed with a slit 16 extending inwardly from the end to a pierce 17. The nib 12 preferably is mounted in the forward section 2 as by a bushing 20 secured as by external threads 21 in a counterbore 22 formed at the inner end of the opening 11.

Figures 2, 4, 6, 7:
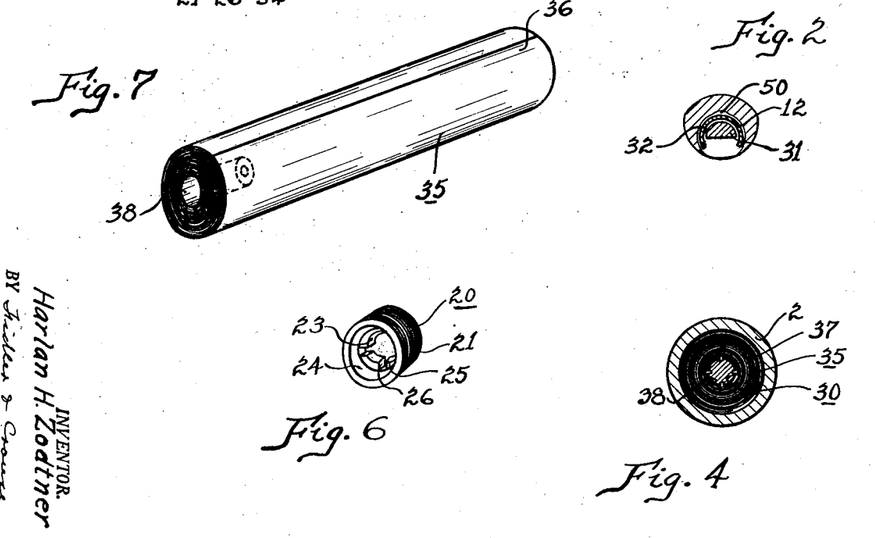
Fig. 2 is a transverse sectional view taken along line 2—2 of Fig. 1.
Fig. 4 is a transverse sectional view taken along line 4—4 of Fig. 1.
Fig. 6 is a perspective view of the bushing for mounting the nib and feed bar.
Fig. 7 is a perspective view of the capillary filler element of the pen shown in Fig. 1.

The bushing 20 (Fig. 6) is formed with a bore 23 and a counterbore 24 which provide an internal flange 25. The nib 12 is adapted to be received snugly in the counterbore 24 with its inner end seated against the internal flange 25, whereby the nib 12 is appropriately positioned with respect to the other associated members. Extending through the flange 25 is a plurality of slots 26 (Figs. 1, 3 and 6) the purpose of which will be explained more in detail hereinafter.

A feed bar 30 is associated with the nib 12 and is supported by the bushing 20, the body of the feed bar 30 being received snugly in the bore 24 and extending forwardly therefrom and into the nib 12. The feed bar 30 is formed with a reduced forward extension 31 positioned to engage the nib forwardly of the nib pierce 17 in the usual manner. Preferably, the feed bar 30 is of slightly smaller diameter than the body 13 of the nib 12 and thus a generally arcuate capillary space 32 is provided between the feed bar 30 and the nib 12.

The capillary space 32 is connected with the ink storage reservoir by an ink feed slot 33 formed in the upper surface of the feed bar and extending from the rear end of the feed bar 30 to forwardly of the nib pierce 17 in alignment with the pierce 17 and the slit 16. Preferably, additional feed slots 34 (Figs. 1 and 3) are provided in the feed bar 30 and extend from the inner end of the feed bar to the capillary space 32 between the nib 12 and the feed bar 30.

The opening 11 preferably is provided with a relieved portion in its upper wall, above the nib 12, which defines with the nib 12 an arcuate capillary ink space 50 (Figs. 1 and 2) extending along the nib 12 and communicating with the slit 16 and pierce 17. In the operation of the pen, ink is drawn into the space 50 by capillary action and maintains this space filled, whereby the adjacent portion of the pen is continually wetted and the pierce and slit always contain ink, and the pen therefore is at all times in condition for instant writing.

In accordance with the present invention, a capillary filler-and-reservoir element (also referred to as a "filler element") is provided for defining an ink storage reservoir which fills by capillary action and which retains the ink by capillary action in such manner that it will not leak therefrom even when the pen is subjected to conditions which might otherwise cause leakage as, for example, changes in temperature or pressure but which reservoir permits the ink to be withdrawn uniformly from the pen under the capillary action established between the nib and the writing surface when the pen is used in writing. To this end the present invention provides a capillary filler-and-reservoir element 35 (illustrated somewhat diagrammatically in the drawings for a clearer understanding thereof), which takes the form of a thin-walled member 36 spirally wrapped or rolled into convolute form, the consecutive convolutions or turns of which are spaced apart to define therebetween a capillary ink storage space 37 of generally spiral transverse cross-section and extending longitudinally substantially throughout the reservoir chamber 10. The turns or convolutions of the spirally wrapped wall member or sheet preferably are spaced uniformly to provide a space of uniform wall-to-wall width throughout its several turns. Since consecutive convolutions of the wall member 36 are relatively close together, they have the effect of being circular and disposed substantially concentrically with the spaces defined between consecutive convolutions substantially annular in shape. In other words, these spaces constitute in effect a series of concentric spaces or chambers, each of which merges or connects with the next adjacent space along a longitudinally extending line of juncture. However, while the construction of such filler element thus provides a space somewhat similar to a series of concentric chambers, all such chambers are connected for the flow of ink therebetween and actually form a single space.

The capillary filler element 35 is formed from a thin sheet of suitable material, such as metal or plastic, having a surface sufficiently wettable by inks of the type customarily used in fountain pens to exert the desired capillary attraction on the ink. The material has sufficient flexibility to permit it to be rolled into convolute form and sufficient rigidity to maintain its shape and position. In addition, the material is one which is suitably resistant to the ink used so that it is not deteriorated thereby and does not adversely affect the ink. Excellent results have been obtained by forming the capillary filler element from materials such as silver foil, gold foil, or cellophane. The material from which the filler element is formed may be suitably treated in a known manner to provide a surface having increased wettability.

In order that the filler element may have the maximum practicable ink capacity, it is so formed as to have as great as possible a capillarity, limited however to a capillarity not greater than that which will permit the ink to be written out of the pen. For a sheet formed from a material having any particular degree of wettability the capillarity of the filler element may be predetermined by suitably spacing the turns of the sheet to provide a capillary space of suitable width between opposing walls. The filler element preferably is made of such length that the capillary space therein is substantially filled when the pen is filled by holding it in a vertical position. Thus, even if the pen is filled by holding it at an acute angle to the surface of the body of ink from which the pen is being filled, the pen will not be overfilled, with the consequent possibility of leakage when moved to a vertical position.

The capillary filler element preferably is of such size that it substantially fills the space in the reservoir chamber 10. The width of the sheet, therefore, corresponds substantially to the length of the reservoir. The sheet is of such length that when rolled into spiral form, with the consecutive turns spaced the desired distance, the filler element is of a diameter to fit snugly in the reservoir. It will be seen, therefore, that the capillary space 37 provides the principal ink storage space of the pen and constitutes in effect the ink reservoir space. However, if desired, additional capillary reservoir space may be provided in the chamber in addition to that provided by the filler element as, for example, by spacing the outer turn of the filler element from the chamber wall.

The capillary filler element 35 after having been formed into its convolute shape is inserted in the reservoir chamber 10 (Fig. 1) with its forward end in abutment with the forward end wall of the reservoir chamber and the inner end face of the mounting bushing 20, thereby placing the capillary space 37 in direct communication with the slots 26 in the bushing 20. While the feed bar 30 may terminate with its inner end flush with the rear or inner end of the mounting bushing 20, preferably it is of such length that it projects rearwardly into the reservoir chamber 10, as shown in Fig. 1. In order to accommodate the projecting end of the feed bar 30, the capillary filler element 35 is formed with an axial, generally cylindrical recess 38 (Fig. 7) of such length and diameter as to snugly receive the feed bar 30. The recess 38 may be provided by forming the sheet 36 with a notch or cut out portion 39 (Fig. 8) at one side edge of the sheet and extending throughout a portion only of the length of the sheet. The sheet 36 is then rolled, beginning with the end edge adjacent the notch so that when the sheet is rolled into convolute form (Fig. 7) the recess 38 is formed. It will thus be seen that when the capillary filler element 35 is disposed in the reservoir chamber 10 it receives and completely surrounds the projecting end of the feed bar 30 and that at least certain of the convolutions of the capillary space 37 are placed in direct feeding communication with the feed slots 33 and 34 in the feed bar.

The capillary filler element 35 is retained in position in the reservoir chamber 10 in a suitable manner, as for example, by causing the inner end 40 of the rear body member 3 to abut against the rearward end of the capillary filler element 35. However, means preferably are provided for yieldingly positioning the capillary filler element 35 in such manner that it is held firmly in position without, however, subjecting it to damaging longitudinal stresses. This may be accomplished by inserting between the rear end of the capillary filler element 35 and the forward end 40 of the member 3 a resilient member such as a rubber ring or washer 41.

Means are provided for venting the reservoir chamber 10 to atmosphere in order to maintain the pressure in the reservoir equal to atmospheric pressure and thus permit the pen to fill rapidly and to prevent leakage or choking of the pen such as otherwise might occur upon the establishment of a pressure differential between the interior and exterior of the pen as a result of a change in temperature of the pen or a change in atmospheric pressure.

In the specific embodiment illustrated (Fig. 1) a vent passage 45 is provided in the rear body section 3 which passage communicates through a vent passage 46 in the tail piece 5 with an outlet port 47 formed in the tail piece 5 adjacent the joint between the tail piece 5 and the rear member 3. Thus, when the tail piece 5 is unscrewed slightly the port 47 provides free communication between the vent passage 46 and the exterior of the pen. When the tail piece 5 is screwed down, the port 47 may be completely closed but, preferably, the joint is not made air tight and permits air to leak therethrough so that the interior of the pen is sufficiently vented at all times to maintain substantial equality in the pressure between the external atmosphere and the interior of the pen.

The pen of the present invention is filled by merely inserting the forward end of the pen in a supply of ink, the tail piece 5 preferably being unscrewed slightly to provide free venting of the interior of the pen. Ink is drawn into the pen by capillary action and rises in the capillary system by reason of the capillary connection between the several portions thereof. Ink is drawn into the pen through the arcuate space 32 between the nib 12 and the feed bar 30 and thence through the feed slots 33 and 34 in the feed bar 30 and into the adjacent portions of the capillary space 37. Ink also may be drawn into the nib slit 16 and thence into the arcuate space 32. Also, ink may be drawn in through the space between the nib 12 and the body and thence through the space between the nib 12 and the bushing 20 and thence through the slots 26 and into the capillary space 37. Where the pen is inserted to a sufficient extent in the supply of ink, ink may be drawn directly into the slots 26 and into the capillary space 37. The slots 26 provide filling passages having a relatively large total cross-sectional area and thus permit rapid filling of the pen.

While ink is drawn initially into those portions of the capillary space 37, which are in direct communication with the feed slots 33 and 34, and with the slots 26 in bushing 20, it finds its way into the remaining portions of the spiral capillary space 37 inasmuch as all of the convolutions of this space are connected to one another. Ink rises in the space 37 by reason of the capillary action effective therein to a height which depends upon the capillarity of this space. As explained hereinabove the capillary filler element 35 is so constructed that its capillarity is such as to cause ink to rise substantially to the top of this element and completely fill the capillary space 37.

Air which is in the capillary space 37 at the beginning of the filling operation is forced out by the incoming ink and finds its way through the vent passages 45 and 46 and the vent outlet 47 and out of the pen. Since all portions or convolutions of the convolute capillary space 37 communicate at the rear end of the capillary filler element with the vent passage 45, the air which is forced out of these spaces passes freely into the vent passage. The outer convolutions of the space 37, which terminate adjacent the positioning washer 41, may communicate with the vent 45 by reason of the fact that the abutment between the filler element 35 and the ring 41 is not sufficiently accurate to form an air seal. However, if desired, the ring may be provided with one or more slits or notches 42 to provide free passage of air through the wall of the ring 41.

The convolute or spiral ink space 37, defined by the wall 36 is self-venting and the capillary filler element does not require the provision of any separate venting passage in the filler element between the several portions of the space 37 and the rear vent passage 45. Accordingly, substantially all of the void space within the capillary filler element 35 may be made of capillary width and utilized as ink storage space. In the event that an air bubble should form in any portion of the capillary space 37 at any time, and especially during the filling operation, such bubble will tend to rise in the capillary filler element until it passes out of the top of the latter. Since all of the several turns or convolutions of the capillary space 37 are connected, an air bubble, if blocked against rising in any particular portion of the space 37, will drift into another portion wherein it can find its way out through the rear end of the filler element 35.

While it is very unlikely that a circumferentially continuous body of air would ever be formed across the capillary space between an upper and a lower body of ink, yet even if this should ever occur the pen would not air-lock and filling would not be prevented. While the pen is so constructed that all portions of the capillary space 37 are made to have as nearly equal capillarity as possible, yet owing to slight variations in dimension between the various portions of the space 37, which occur in manufacture the capillarity of the several portions of the space 37 will vary, even if only to a very small degree. This small variation will provide, in one portion of the filler element 35, a capillary path having a slightly higher capillarity than a path in another portion of the filler element 37. Thus, ink will tend to rise along the path of greatest capillarity during filling and air will be expelled along the paths of lesser capillarity so that a condition which may be considered a condition of instability is created which will tend to break up any such continuous body of air and prevent it from causing air-locking of the pen. Moreover, the filler element 35 may be provided, in the course of rolling of the sheet 35, with a central space 48 of slightly greater transverse dimension than the remainder of the void space which central space provides a path of lesser capillarity and permits air to be vented therethrough during filling.

In writing, when the writing tip of the pen nib 12 is applied to the writing surface, the capillarity established between the writing tip and the writing surface causes ink to be drawn from the pen. Ink to replace that which is withdrawn in writing, or which evaporates during periods of non-writing is drawn from the capillary space 37, through the feed slots 33 and 34 in the feed bar 30, and finds its way into the arcuate space 32 and thence into the nib slit 16. Ink also may be drawn through the nib pierce 17 and into the space 50 above the nib, thereby providing a quantity of ink which maintains the nib slit wetted at all times so that the pen is ready for instant writing. As ink is drawn into the feed slots 33 and 34 from the adjacent portions of the capillary space 37, ink flows from the remaining turns or the space 37 to replace such withdrawn ink and to maintain the feed slots 33 and 34 continuously filled with ink so that there is no interruption in the feed to the nib.

Air to replace ink which is withdrawn during writing or which evaporates from the nib during periods of non-writing may be drawn into the pen through the vent passages in a direction reversely to that in which ink is expelled during filling. Air also may enter through the opening 11 in the front end of the pen and pass between the feed bar 30 and bushing 20 and thence through one or more of the openings 26 in the bushing 20 and into the capillary filler element 35. For reasons generally similar to those discussed in connection with the filling of the pen, the pen is not subject to air-locking during writing but writes freely and evenly until substantially emptied.

The feed connecting the capillary filler element with the writing tip of the nib 12 preferably is so formed that each section is progressively of greater capillarity toward the writing tip of the nib, thus insuring that ink will be drawn from the filler element to the writing tip. Accordingly, the feed slots 33 and 34 in the feed bar 30, are of lesser width than the space 37. The arcuate space 32 is of still lesser width, and the nib slit 16 has the least width and accordingly greatest capillarity of any portion of the ink path. On the other hand, the capillarity of the turns of the space 37 must be sufficient to lift ink to the desired height in the pen when the pen is held vertically and the writing end inserted in a supply of ink. While the optimum width of such space depends upon a number of factors, such as the wettability of the surfaces of the material forming the filler element and the nature of the ink used, such factors are capable of ready determination and the necessary spacing readily may be determined.

The capillary filler element may be formed in various sizes and dimensions. In one practical embodiment of a fountain pen employing my invention and having over-all dimensions approximately equal to those of a conventional fountain pen excellent results were obtained by forming a filler element as follows: A sheet of silver foil approximately 0.001" in thickness and approximately 8" long by approximately 1¼" wide was spirally wrapped into a roll (Fig. 1) approximately 0.310" in diameter wherein the consecutive turns of the sheet were spaced apart approximately 0.008" between opposite wall surfaces; the innermost turn was formed to provide an air vent passage of approximately 0.060" in diameter. The feed slots 33 and 34 in the feed bar (Fig. 1) and the capillary space 32 were of less width than the spacing between opposite wall surfaces of the filler element but were wider than the nib slit 16, which was from 0.001" to 0.0015" in width, and generally were approximately 0.003" in width. My invention is not limited to the foregoing dimensions and it will be understood that the latter may be varied without departing from the invention. For example, excellent results have been obtained by forming filler elements from sheets ranging in size from 8" to 15" in length and 1¼" to 2" in width, in which filler elements the spacing between turns ranged from approximately 0.008" for an 8" sheet to 0.004" for a 15" sheet.

The several portions of the space 37 may be directly connected to the ink feed, thereby facilitating filling of the pen and insuring a highly effective feed of ink from the capillary space 37 to the nib 12. This may be accomplished by providing, at the forward end of the capillary filler element 35, means defining a plurality of feed passages extending from the feed bar slots 33 and 34 into communication with all of the several convolutions of the capillary space 37.

Figures 8, 9, 10, 11, 18, 19:
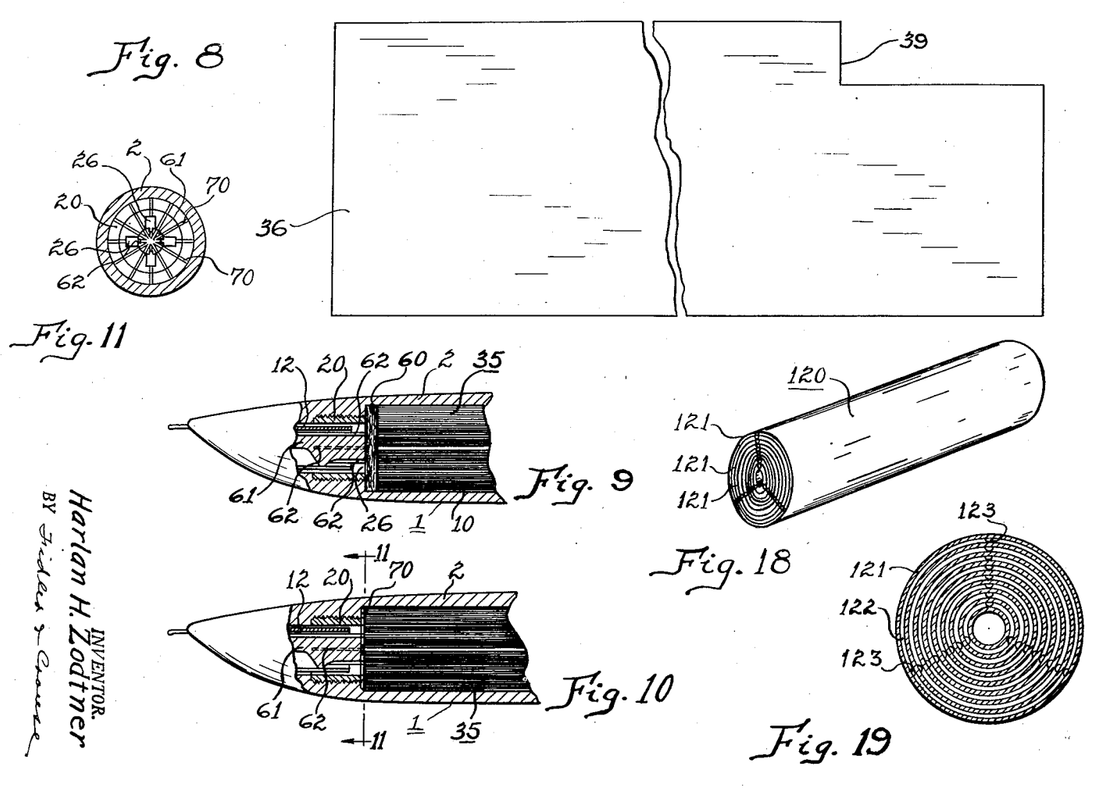
Fig. 8 is a top plan view of the sheet or strip from which the capillary filler element is formed.
Fig. 9 is a fragmentary, longitudinal sectional view showing a second embodiment of the invention.
Fig. 10 is a fragmentary, longitudinal sectional view showing still another embodiment of the invention.
Fig. 11 is a transverse, cross-sectional view taken along line 11—11 of Fig. 10.
Fig. 18 is still another form of filler element in accordance with the invention.
Fig. 19 is a somewhat enlarged transverse cross-sectional view taken along line 19—19 of Fig. 18.

One form of pen embodying such a feed means is illustrated in Fig. 9 wherein a feed element which takes the form of a pad 60 of matter or woven fibers is interposed between the forward end of the capillary filler element 35 and the adjacent end of the chamber 10. The feed bar 61 preferably terminates at its rearward end substantially flush with the forward wall of the chamber 10 so that the pad 60 extends across substantially the entire area of the end of the filler element 35 and the corresponding faces of the end wall of the chamber 10, the rear end of the bushing 20 and the rear end of the feed bar 61. The pad 60 thus provides direct communication between the several convolutions of the capillary space 37 and the feed slots 62 in the feed bar 61, as well as the slots 26 in the bushing 20.

The pad 60 preferably is formed in such a manner as to provide a plurality of capillary passages having a greater capillarity than the space 37 of the capillary filler element 35. Preferably, the fibers are constituted by a material, such as nylon, which is not adversely affected by the ink and which is not absorbent.

The feed element also may be defined in other ways as illustrated, for example, in Figs. 10 and 11 of the drawings. In this embodiment of the invention, no separate feed element is provided, but a series of grooves or slots 70 of capillary dimensions are formed in the forward end wall of the body section 2, the rear end wall of the bushing 20 and the rear end of the feed bar 61. Preferably, the slots 70 are formed along diameters of the end faces of the members just mentioned and by reason of the abutment between the forward end of the filler element 35 and these members each of slots 70 intersects all of the several convolutions of the space 37 to place the latter in feed communication with the several feed slots formed in the feed bar 61.

The operation of the forms of the invention illustrated in Figs. 9, 10, and 11, is substantially similar to that described in connection with the form shown in Fig. 1. However, the direct feed connection between the feed bar slots and the several convolutions of the space 37 provided by the feed element (60 and 70 respectively) permits more rapid filling owing to the greater cross-sectional area of the space 37 which is directly connected to the ink in the passages.

Figure 12:
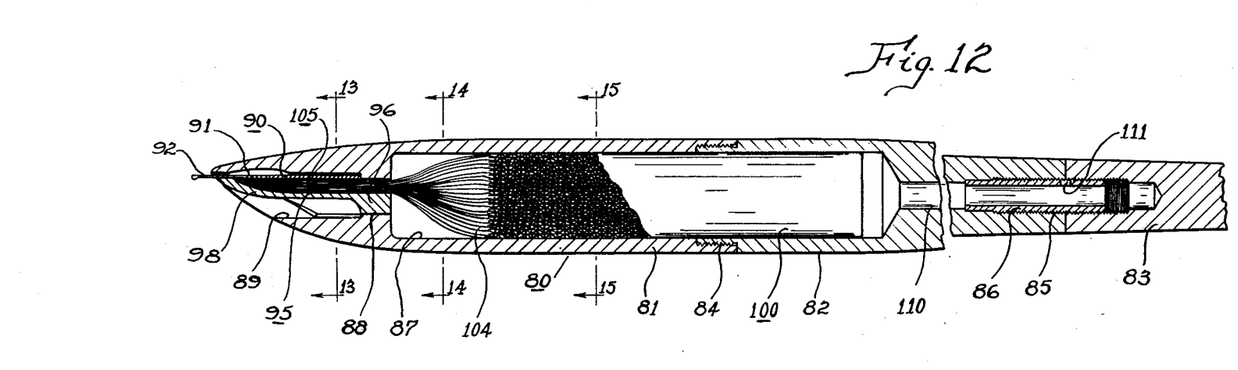
Fig. 12 is a longitudinal sectional view of still another embodiment of the invention.
Figures 13, 14, 15, 16, 17:
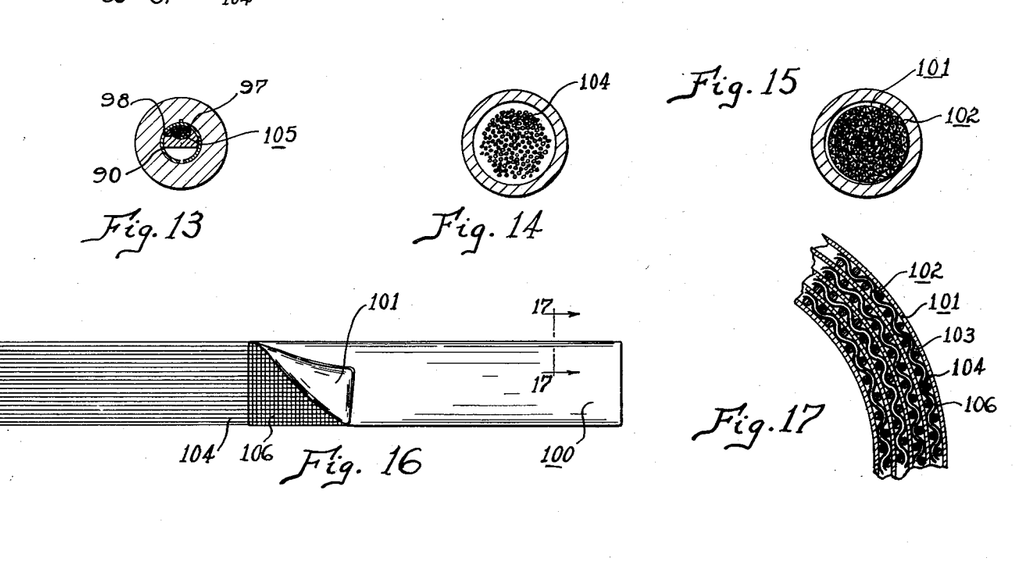
Fig. 13 is a transverse sectional view taken along line 13—13 of Fig. 12.
Fig. 14 is a transverse sectional view taken along line 14—14 of Fig. 12.
Fig. 15 is a transverse sectional view taken along line 15—15 of Fig. 12.
Fig. 16 is a side elevational, somewhat diagrammatic view showing the capillary filler element of the pen of Fig. 12, with a portion of the outer turn of the sheet folded back to expose the spacer sheet.
Fig. 17 is an enlarged, fragmentary sectional view taken along the line 17—17 of Fig. 16.

Referring now to Figs. 12 to 17 inclusive and particularly to Fig. 12 there is shown a fountain pen embodying another form of filler element constructed in accordance with my invention. This pen is generally similar to the pen illustrated in Figs. 1 to 11 and is described in detail only in respect to these features of construction and operation in which it differs from the previously described embodiment.

The pen includes a body 80 formed preferably by a barrel or forward section 81, a rear section 82 and an end piece 83 connected respectively by threaded joints 84 and 85, the latter of which may include a threaded bushing 86. The body 80 is formed with a bore 87 defining an ink reservoir chamber, a smaller bore 88 leading therefrom and a counterbore 89 extending through the forward end of the barrel 81.

A pen nib 90 which may be similar to but relatively shorter than the nib 12 is snugly seated frictionally in the counter-bore 89 with its writing tip projecting beyond the end of the body 80. A feed bar 95 is associated with the nib 90 and has a body portion 96 fitted snugly into the bore 88, and a reduced portion 98 extending forwardly in the nib 90, with its forward end engaging the under side of the nib 90 forwardly of the nib pierce 91. The feed bar 95 is formed with a groove 97 extending longitudinally thereof from the rear end to short of the forward end for receiving a feed element 105 hereinafter described more in detail.

Disposed in the ink reservoir chamber 87 is a capillary filler element 100 adapted to function in a way generally similar to the filler element 35 described in connection with the pen shown in Figs. 1–11. The filler element 100 includes a wall-forming member 101 (Figs. 15 and 16) of suitable thin-walled sheet material and a spacer sheet 102 of woven material, which sheets are spirally wrapped or rolled together into convolute form to provide a capillary space 103 of convolute shape between the turns of the wall-forming sheet 101. The wall-forming sheet 101 preferably is formed from gold or silver foil or cellophane. The sheet 102 preferably is woven from threads or filaments formed from a material which is resistant to the inks used and is not absorbent, and may be, for example, glass fiber threads, plastic fiber threads or plastic filaments. If desired, a plurality of each of these two types of sheets may be arranged in alternation and then rolled together, but preferably only two sheets are used, as explained hereinabove. When the sheets are rolled together into convolute form the spacer sheet 102 serves to space consecutive convolutions of the wall-forming sheet 101 in a positive manner throughout the entire length of the sheets. The interstices between the threads 104 and 106 which form the spacer sheet 102 provide, within the continuous capillary space 103, a plurality of interconnected spaces or cells of capillary size extending throughout the capillary filler element.

The capillary space 103 is connected in ink-feeding relation to the nib 90 by a feed element 105 which preferably defines a plurality of capillary paths or channels, each having a capillarity greater than that of the cells in the capillary space 103. While the feed element may be formed in various ways, it preferably is provided by forming a fringe extending from the forward edge of the spacer sheet 102. This may be accomplished conveniently by removing from one end of the spacer sheet 102, prior to assembly with the other sheet, those threads 106 which extend spirally when the sheets are spirally wrapped, thus leaving only the longitudinal threads 104 at this portion of the sheet 102. Hence when the sheets 101 and 102 are rolled together, the longitudinal threads 104 extend from the end of the roll, as illustrated somewhat diagrammatically in Fig. 16 of the drawings. The extending ends of the threads 104 are brought together and inserted in the passage or space defined by the groove 97 in the feed bar 95 and, by the corresponding portion of the nib 90, and the threads 104 terminate at the forward end of the groove 97 adjacent the nib pierce 91 and slit 92. The threads 104 are compacted between the nib 90 and feed bar 95 and define a plurality of generally parallel capillary passages of small cross section and high capillarity.

The portions of the threads 104 which extend from the feed bar 95 rearwardly to the forward end of the capillary filler element 100 preferably are so arranged that they are progressively less compacted and thus the passages provided between such portions of the threads 104 decrease in capillarity from front to rear. Thus it will be seen that the capillarity of the filler element 100 and the several portions of the feed element 105 increases toward the nib and thus ink is drawn from the capillary filler element toward the nib at all times and the nib slit and pierce maintained in filled condition. The nib slit 92 has the greatest capillarity of any portions of the capillary system in order to insure that ink is drawn therein from the adjacent feed element 105.

This form of fountain pen operates in a manner generally similar to the form above described. The pen is filled by inserting the forward end in a supply of ink, the rear end piece 83 preferably first having been unscrewed to freely vent the rear end of the reservoir chamber 87. Ink is drawn into the pin through the space between the nib 90 and feed bar 95 and thence into the capillary passages defined by the feed element 105 and into the capillary space 103 in the filler element 100. Ink also may be drawn into the space between the nib 90 and the wall of the counter-bore 89 above the nib and thence through the nib pierce 91 and slit 92 and into the feed element 105. Ink rises in the feed element 105 and enters the capillary space 103 in the filler element and rises in the latter until it is filled. Air, which is in the space 103 at the beginning of the filling operation, is forced out in a rearward direction by the incoming ink and is expelled through the vent passage 110 in the body and a vent 111 in the bushing 86 adjacent the joint between the rear section 82 and tail piece 83.

When the pen is used in writing, ink is drawn from capillary space 103 in the filler element 100 along the capillary passages defined by the feed element 105 and thence into the nib slit 92. Owing to the increase in capillarity of the feed passages from the filler element in a direction toward the nib slit, as explained hereinbefore, ink is drawn toward the nib and maintained at the nib slit at all times when any ink is in the pen and the pen, therefore, is always ready for instant writing.

Various modifications may be made in the filler element illustrated in connection with the fountain pen shown in Figs. 12–17, inclusive; for example, the wall-forming sheet which is rolled with the woven spacer sheet may, if desired, be formed with a plurality of small perforations throughout the portions forming each convolution in a manner generally similar to the perforations in the filler element disclosed and claimed in the copending application of Floyd E. Bartell, Serial No. 732,032, filed March 3, 1947. Such perforations provide inter-communication between adjacent convolutions of the capillary space and permit ink or air to flow readily between adjacent convolutions. Accordingly the fluid pressure within the capillary filler element is equalized at all times. During filling, ink which is drawn into the capillary filler element may pass readily to all portions of the capillary space; also air which is in the capillary space may pass through the convolutions of the perforated sheet from one portion of the capillary space to another.

If desired, the wall-forming sheet may be formed with a plurality of small corrugations extending longitudinally of the capillary filler element, which corrugations provide a plurality of longitudinally extending capillary spaces between the corrugated sheet and the adjacent turn of the spacer sheet in a manner somewhat analogous to that in which capillary spaces are provided in the structure disclosed and claimed in the copending application of Frederick R. Wittnebert, Serial No. 584,756, filed March 26, 1945, which spaces form a portion of the spiral capillary space defined between consecutive convolutions of the corrugated sheet. The longitudinally extending spaces defined by the force of corrugations thus provide additional ink capacity supplementing that provided by the interstices of the spacer sheet. This embodiment of the invention operates substantially as described in connection with the non-corrugated sheet shown in Figs. 12 to 17; it will be understood, of course, that when the pen is filled, ink enters and fills the longitudinally extending capillary space defined by the corrugations, as well as the spaces or cells constituted by the interstices of the woven spacer sheet.

The capillary filler element, instead of being formed from a spirally wrapped sheet, may be constituted by a plurality of tubes or cylindrical wall members of graduated diameters disposed in telescoping, spaced coaxial arrangement defining therebetween a plurality of annular capillary ink spaces as disclosed and claimed in my copending divisional application, Serial No. 169,130, filed June 20, 1950. Such a construction is illustrated somewhat diagrammatically in Figs. 18 and 19 wherein a filler element 120 includes a plurality of thin-walled cylindrical members 121 disposed in telescoping coaxial arrangement and spaced apart to define annular chambers 122 of capillary width. The cylindrical members 121 are formed from material which has a surface suitably wettable to provide the desired capillary action and which is sufficiently rigid to retain the shape and position of the walls and resistant to the ink.

These members may be formed of glass, plastics or metal. The cylindrical members 121 preferably are maintained in spaced relation by a plurality of indents or projections 123 disposed at the ends thereof and arranged approximately 120° apart around the periphery of the tube. Preferably several tubes are secured together to form an integral unit and this conveniently may be accomplished by securing them at the indents or projections as by fusing or other suitable mode of joining.

The filler element 120 may be incorporated in a pen such as illustrated, for example, in Fig. 9 or Fig. 10 of the drawings by substituting it for the filler element 35 and may be held in place suitably as by a ring such as the ring 41 shown in Fig. 1.

The operation of this latter form of my invention is generally similar to that described in connection with the pen shown in Figs. 9 and 10 of the drawings. In filling, ink is drawn into the individual capillary spaces 122 and rises therein as will be understood. The air which is in these spaces is forced out through the rear end of the pen by the incoming ink. Owing to the relatively large transverse (i. e. circumferential) dimension of each annular capillary space relatively to its capillary width, there is substantially no likelihood of any air-locking. Thus, if an air bubble should form in any of these spaces, it would be very unlikely that such bubble would extend continuously throughout the entire circumferential extent of the space. Even if this should occur, it is believed the ink would tend to rise unevenly in the space and a portion of such bubble would tend to drift or be forced upwardly in the space and the space thus would not air lock. For generally similar reasons the filler element is not subject to air locking during writing.

It will be seen from the foregoing that the present invention provides a capillary fountain pen, wherein the capillary filler element is so formed that it provides a maximum of effective ink space in a pen of any particular over-all dimensions. The wall member which forms the capillary filler element may be made of very thin material and may be as thin as approximately 0.001 of an inch in thickness and thus consumes a relatively small percentage of the total volume of the capillary filler element. Also, inasmuch as it is not necessary to provide a separate air vent passage in the capillary filler element, substantially all of the void spaces within the filler element may be employed as ink storage space. Moreover, the capillary filler element is inherently self-rigid and does not require any supporting or mounting means but may be inserted directly in the reservoir chamber of a pen body and may be supported solely by contact with the side and end walls of such chamber. In the event that it is found desirable to provide a positioning member such as the ring described hereinbefore, such member may be of relatively small dimensions and thus not consume any substantial space.

The capillary filler element may be formed simply and inexpensively from any one of a relatively large number of suitable materials, thus permitting a wide range of selection of materials in the formation of this member. The assembly of the capillary filler element in the body is an extremely simple operation and does not require any special tools or the use of any accurately machined or close fitting parts. While it is of course desirable that the nib and feed bar be accurately formed and positioned, on the other hand the capillary filler element itself requires no machining and no close fit with the associated members.

The capillary filler element has an ink space of relatively large cross section which provides a flow path of relatively large capacity and thus the pen may be filled rapidly by capillary action. The large cross section of the ink space also permits it to be connected through a relatively large number of capillary feed passages to the feed section thus insuring an adequate feed of ink to the nib.

The large cross-sectional extent of the capillary space within the filler element insures that the filler element will free itself of any air bubbles which may be created in the ink space either during filling or during writing and thus will prevent air-locking. Moreover, the capillary filler element is so formed that substantially all of the capillary space is of uniform capillarity and therefore substantially all of this space will fill and write out. Accordingly, the filler element has a relatively high effective ink capacity. In addition, the filler element is of such form that it has a minimum of corners or sudden changes in cross-sectional area and thus there is a minimum possibility of capillary edge effect occurring within the pen which might otherwise detrimentally affect the rapidity and completeness of filling and the completeness of writing out.

I believe that the operation and advantages of my invention will be well appreciated from the foregoing description, and it is to be understood that, while I have shown and described several forms of my invention, other details and arrangements of parts may be resorted to without departing from the spirit and scope of my invention as defined by the claims that follow.

I claim:

1. A fountain pen comprising a body having a reservoir section and a feed section, a writing element at the forward end of said body, ink feed means in said feed section and connected in ink feeding relation with said writing element, and a capillary filler-and-reservoir element in said reservoir section including a member of non-absorbent material having opposed wall portions spaced apart substantially throughout their length and breadth and defining a substantially unobstructed, capillary ink storage space of generally spiral cross-section in a direction transversely of said filler-and-reservoir element and extending longitudinally thereof and connected at its forward end with said feed means.

2. A fountain pen comprising a body having an ink reservoir chamber, a writing element at the forward end of said body, a capillary filler-and-reservoir element in said chamber and including a non-absorbent convolute wall member having its convolutions spaced apart substantially throughout their length and breadth and defining a substantially unobstructed continuous convolute ink storage space substantially equal in length to the length of said reservoir chamber and open at opposite ends, feed means connected to one open end of said convolute space and to said writing element, and means for venting the other open end of said convolute space to atmosphere.

3. A fountain pen comprising a body having a reservoir section and a feed section, feed means disposed in said feed section and providing a capillary ink feed passage, a pen nib associated with said feed means, capillary filler-and-reservoir means including a sheet member of rolled form disposed in said reservoir section and having consecutive convolutions spaced substantially throughout their length and breadth to define therebetween a capillary ink storage space of generally convolute form extending longitudinally of said reservoir section and open at its front and rear ends, said sheet member being disposed with its forward end abutting said feed means thereby to place at least a plurality of the convolutions of said capillary space in ink feeding relation with the capillary feed passage of said feed means and means for venting the rear end of said space to atmosphere.

4. A fountain pen comprising a body having a reservoir section and a feed section, a nib at the forward end of said body, a feed bar in said feed section and having a capillary feed passage extending into feeding relation with said nib, and a capillary filler-and-reservoir element disposed in said reservoir section and including a spirally rolled wall member the convolutions of which are spaced apart substantially throughout their length and breadth at a distance to define therebetween a capillary ink storage space, said filler-and-reservoir element at its forward portion being disposed in telescoping relation with said feed bar to place a plurality of the convolutions of said capillary space directly in communication with the feed passage in said feed bar.

5. A fountain pen comprising a body having a reservoir section and a feed section, a capillary filler-and-reservoir element defining a capillary ink storage space of convolute cross-section extending longitudinally of said reservoir section, a nib at the forward end of said body, and feed means connecting said convolute space in ink feeding relation with said nib and including a plurality of capillary passages extending transversely of said pen and across and directly in communication with the forward end of a plurality of the convolutions of said convolute space and a feed passage extending longitudinally of said pen and connecting said transversely extending passages in ink feeding relation with said nib.

6. A capillary ink storage element for a fountain pen comprising a sheet of thin-walled material of sufficient rigidity to maintain its shape spirally rolled upon itself with the convolutions thereof mutually spaced substantially throughout their length and breadth and defining therebetween a spirally continuous ink storage space of substantially uniform, capillary, wall-to-wall dimension, said element having sufficient capillarity to fill itself by capillary action and to retain the ink therein but insufficient to prevent withdrawal of the ink in writing.

7. A capillary ink storage element for a fountain pen comprising a thin-walled member formed from metal foil of sufficient rigidity to maintain its shape and position and having surfaces readily wettable by and substantially inert to liquid inks, said member being of convolute form and defining between the convolutions thereof a substantially continuous and unobstructed capillary ink-storage space of convolute cross-sectional shape, and extending longitudinally of said element, said element having sufficient capillarity to fill itself by capillary action and to retain the ink therein but insufficient to prevent withdrawal of the ink in writing.

8. A fountain pen comprising a casing having a reservoir chamber, a writing element at the forward end of said casing, a capillary filler-and-reservoir element in said chamber and including a thin-walled substantially plain-surfaced sheet member of spirally rolled form the convolutions thereof being spaced substantially throughout their length and breadth and defining therebetween a substantially unobstructed, continuous capillary ink storage space of spiral cross-sectional shape and extending longitudinally of said chamber, the inner convolution of said member defining a longitudinally extending air vent passage of greater than capillary width communicating with said storage space, means for venting said passage to atmosphere, and ink feed means connecting said storage space in ink feeding relation to said writing element.

9. A fountain pen comprising a body having a reservoir section and a feed section, a pen nib carried by said body, capillary filler-and-reservoir means including a sheet member of rolled form disposed in said reservoir section and having consecutive convolutions spaced substantially throughout their length and breadth to define therebetween a capillary ink storage space of generally convolute form extending longitudinally of said reservoir section and open at its front and rear ends, and a member rolled together with said sheet member, disposed in and substantially throughout the space between and abutting the convolutions of said sheet member and serving to maintain said convolutions in predetermined, spaced relationship, feed means disposed in said feed section and providing a capillary ink feed passage connecting said ink storage space and said nib, and means for venting said space to atmosphere.

10. A fountain pen comprising a body having a reservoir section and a feed section, a pen nib carried by said body, capillary filler-and-reservoir means including a sheet member of rolled form disposed in said reservoir section and having consecutive convolutions spaced apart substantially throughout their length and breadth to define therebetween a capillary space of generally convolute form extending longitudinally of said reservoir section and open at its front and rear ends and a spacer member disposed in said space, spacing said convolutions and dividing the space therebetween into a plurality of capillary ink storage cells, feed means disposed in said feed section and providing a capillary ink feed passage connecting said cells and said nib, and means for venting said space to atmosphere.

11. A fountain pen comprising a body having a reservoir section and a feed section, a pen nib carried by said body, capillary filler-and-reservoir means including a sheet member of rolled form disposed in said reservoir section and having consecutive convolutions spaced apart substantially throughout their length and breadth to define therebetween a capillary space of generally convolute form extending longitudinally of said reservoir section and open at its front and rear ends and a spacer member of cellular material interposed between and abutting said convolutions to maintain the latter in predetermined, spaced relationship and serving to define a plurality of capillary ink storage cells within said space substantially throughout the latter, feed means disposed in said feed section and providing a capillary ink feed passage connecting said cells and said nib, and means for venting said space to atmosphere.

HARLAN H. ZODTNER.

REFERENCES CITED

The following references are of record in the file of this patent:

UNITED STATES PATENTS

| Number | Name | Date |
|---|---|---|
| 255,205 | Stone | Mar. 21, 1882 |
| 1,001,225 | Sinnott | Aug. 22, 1911 |
| 1,336,119 | Andersen | Apr. 6, 1920 |
| 2,114,118 | Studer et al. | Apr. 12, 1938 |
| 2,462,929 | Zodtner | Mar. 1, 1949 |

FOREIGN PATENTS

| Number | Country | Date |
|---|---|---|
| 515,113 | France | 1921 |
| 703,046 | Germany | 1941 |